(12) United States Patent
Kojima

(10) Patent No.: US 7,636,646 B2
(45) Date of Patent: Dec. 22, 2009

(54) ROUNDNESS MEASURING DEVICE, METHOD AND PROGRAM FOR MEASURING ROUNDNESS

(75) Inventor: Tsukasa Kojima, Sapporo (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 0 days.

(21) Appl. No.: 12/153,340

(22) Filed: May 16, 2008

(65) Prior Publication Data

US 2008/0294369 A1    Nov. 27, 2008

(30) Foreign Application Priority Data

May 22, 2007   (JP)   ............................. 2007-135703

(51) Int. Cl.
*G01B 5/20* (2006.01)
(52) U.S. Cl. ................... 702/168; 702/167; 702/169; 33/503; 33/543; 33/550
(58) Field of Classification Search ......... 702/160–151, 702/167–169; 33/503–505, 543, 551, 546, 33/550, 553–554
See application file for complete search history.

(56) References Cited

FOREIGN PATENT DOCUMENTS

| JP | A-04-329306 | 11/1992 |
|----|-------------|---------|
| JP | A-05-269649 | 10/1993 |
| JP | A-08-122050 | 5/1996 |
| JP | A-2004-093529 | 3/2004 |
| JP | A-2004-108787 | 4/2004 |

*Primary Examiner*—Drew A Dunn
*Assistant Examiner*—Hien X Vo
(74) *Attorney, Agent, or Firm*—Oliff & Berridge, PLC

(57) ABSTRACT

A roundness measuring device includes: an eccentric position calculation unit calculating, based on a measured distance and a measured angle, a distance between a axis of the measured object and a rotation axis as an eccentric distance, and calculating an angle formed between the detection line and a line segment connecting the rotation axis and the axis of the measured object as an eccentric angle; and a measurement correction unit correcting the measured distance based on the eccentric distance, the eccentric angle, the measured angle, a radius of the measured object, and a length from the center to the surface of the detector unit, and correcting the measured angle by adding a correction angle to the measured angle, the correction angle being formed between the detection line and a line segment connecting the rotation axis and a contact point where the measured object and the detector unit come in contact with one another.

15 Claims, 5 Drawing Sheets

ROUNDNESS MEASURING DEVICE, METHOD AND PROGRAM FOR MEASURING ROUNDNESS

CROSS-REFERENCE TO RELATED APPLICATIONS

This application is based upon and claims the benefit of priority from the prior Japanese Patent Application No. 2007-135703, filed on May 22, 2007, the entire contents of which are incorporated herein by reference.

BACKGROUND OF THE INVENTION

1. Field of the Invention

The present invention relates to a roundness measuring device, method and program for measuring the roundness of a measured object.

2. Description of the Related Art

Roundness measuring devices are used to measure the roundness of columnar or cylindrical workpieces (measured objects). Such roundness is measured by mounting a workpiece on a turntable (centering table), rotating the turntable (table rotation type) or revolving a stylus itself around the workpiece, and then tracing the round surface of the workpiece (such as the outer or inner surface) with the stylus. A roundness measuring device of table rotation type obtains measurements based on a displacement of its stylus on a predetermined axis. Examples of such roundness measuring devices are disclosed in Patent Documents 1 to 5 (Patent Document 1: Japanese Patent Laid-Open No. (HEI) 4-329306; Patent Document 2: Japanese Patent Laid-Open No. (HEI) 5-269649: Patent Document 3: Japanese Patent Laid-Open No. (HEI) 8-122050; Patent Document 4: Japanese Patent Laid-Open No. 2004-93529; and Patent Document 5: Japanese Patent Laid-Open No. 2004-108787).

Each of the above-mentioned measurement methods is premised on the assumption that a contact point between a stylus and a workpiece should be located on a predetermined axis (detection line) where the displacement of the stylus can be detected, so that more precise measurements may be obtained by the roundness measurement device of table rotation type. However, such a stylus has a radius with a predetermined distance from its center to the surface, of course. Accordingly, if the workpiece is eccentric with respect to the rotation axis of the centering table, some occasions may arise where the contact point is not located on a predetermined axis depending on the radius of the stylus, which would lead to errors in measurements. Such error problems would notably occur when a measurement is performed on a workpiece in an eccentric position that has a smaller radius than that of the stylus.

Therefore, an object of the present invention is to provide a roundness measuring device that can obtain a measurement with a high degree of accuracy even if a workpiece is eccentric with respect to the rotation axis, and to provide a method of and program for measuring roundness.

SUMMARY OF THE INVENTION

One aspect of the present invention provides a roundness measuring device comprising: a rotation unit rotating a measured object around a rotation axis; a detector unit detecting a contact based on its contact with the measured object; and a measurement acquisition unit assuming a detection line connecting the rotation axis and the center of the detector unit when a contact is detected by the detector unit, obtaining a distance between the rotation axis and an intersection where the detection line intersects a surface of the detector unit as a measured distance, and obtaining a rotating angle provided by the rotation unit as a measured angle, and the roundness measuring device further comprising: an eccentric position calculation unit calculating, based on the measured distance and the measured angle, a distance between the axis of the measured object and the rotation axis as an eccentric distance, and calculating an angle formed between the detection line and a line segment connecting the rotation axis and the axis of the measured object as an eccentric angle; and a measurement correction unit correcting the measured distance based on the eccentric distance, the eccentric angle, the measured angle, a radius of the measured object, and a length from the center to the surface of the detector unit, and correcting the measured angle by adding a correction angle to the measured angle, the correction angle being formed between the detection line and a line segment connecting the rotation axis and a contact point where the measured object and the detector unit come in contact with one another.

With the above mentioned configuration, the roundness measuring device according to the present invention may correct a measured distance and add a correction angle between a detection line and a contact point centered at a rotation axis to the measured angle. Therefore, the roundness measuring device according to the present invention may eliminate any errors in measurements.

Another aspect of the present invention provides a method of measuring roundness using a roundness measuring device having: a rotation unit rotating a measured object around a rotation axis; a detector unit detecting a contact based on its contact with the measured object; and a measurement acquisition unit assuming a detection line connecting the rotation axis and the center of the detector unit when a contact is detected by the detector unit, obtaining a distance between the rotation axis and an intersection where the detection line intersects a surface of the detector unit as a measured distance, and obtaining a rotating angle provided by the rotation unit as a measured angle, the method comprising: an eccentric position calculation step of calculating based on the measured distance and the measured angle, a distance between the axis of the measured object and the rotation axis as an eccentric distance, and calculating an angle formed between the detection line and a line segment connecting the rotation axis and the axis of the measured object as an eccentric angle; and a measurement correction step of correcting the measured distance based on the eccentric distance, the eccentric angle, the measured angle, a radius of the measured object, and a length from the center to the surface of the detector unit, and correcting the measured angle by adding a correction angle to the measured angle, the correction angle being formed between the detection line and a line segment connecting the rotation axis and a contact point where the measured object and the detector unit come in contact with one another.

Still another aspect of the present invention provides a program for measuring roundness using a roundness measuring device having: a rotation unit rotating a measured object around a rotation axis; a detector unit detecting a contact based on its contact with the measured object; and a measurement acquisition unit assuming a detection line connecting the rotation axis and the center of the detector unit when a contact is detected by the detector unit, obtaining a distance between the rotation axis and an intersection where the detection line intersects a surface of the detector unit as a measured distance, and obtaining a rotating angle provided by the rotation unit as a measured angle, the program causing a computer to perform: an eccentric position calculation step of calculating, based on the measured distance and the measured angle, a distance between the axis of the measured object and the rotation axis as an eccentric distance, and calculating an angle formed between the detection line and a line segment connecting the rotation axis and the axis of the measured object as an eccentric angle; and a measurement correction step of correcting the measured distance based on the eccentric distance, the eccentric angle, the measured angle, a radius of the measured object, and a length from the center to the surface of the detector unit, and correcting the measured angle by adding a correction angle to the measured angle, the correction angle being formed between the detection line and a line segment connecting the rotation axis and a contact point where the measured object and the detector unit come in contact with one another.

DETAILED DESCRIPTION OF THE EMBODIMENTS

Preferred embodiments of the present invention will now be described below with reference to the accompanying drawings.

Figure 1:
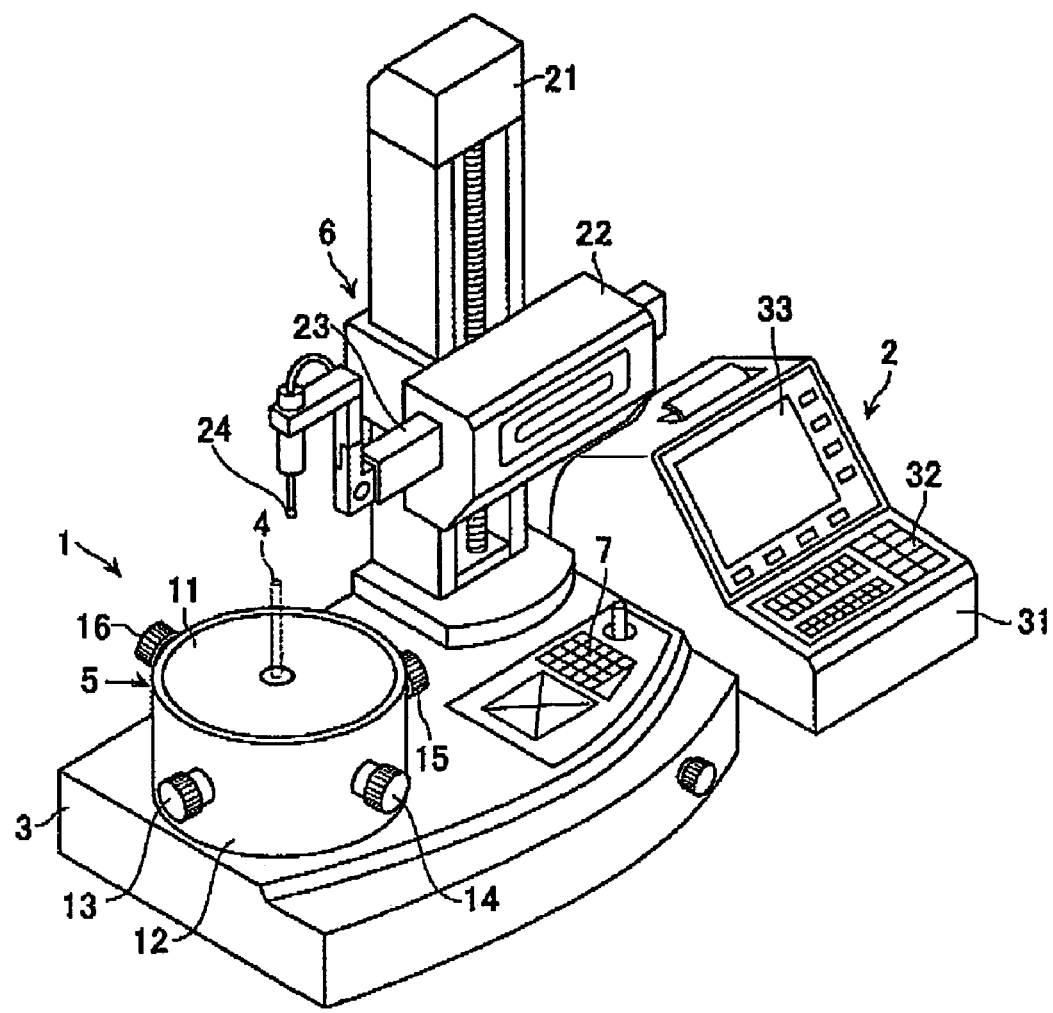
FIG. 1 is a schematic diagram illustrating a configuration of a roundness measuring unit according to an embodiment of the present invention.

Referring now to FIG. 1, external appearance structure of a roundness measuring device according to an embodiment of the present invention will be described below. FIG. 1 is a perspective view of external appearance of the roundness measuring device according to an embodiment of the present invention. The roundness measuring device comprises a measuring unit 1 and a processor 2. The measuring unit 1 includes a base 3, a centering table 5 provided on the base 3, on which table a columnar or cylindrical workpiece 4 is mounted and rotated thereon, a displacement sensor 6 for detecting a radial displacement of the round surface of the workpiece 4 mounted on the centering table 5, and an operation section 7 for operating these.

The centering table 5 is provided to rotate the workpiece 4 mounted on the turntable 11, by rotating and driving a discoid turntable 11 with a rotary driver 12 positioned under the discoid turntable 11. The rotary driver 12 has a side surface, in which centering knobs 13 and 14 for adjusting axis misalignment, as well as leveling knobs 15 and 16 for adjusting inclination, are positioned at angular intervals of substantially 90° in circumferential direction. Through the operation of these knobs 13 to 16, centering and leveling of the turntable 11 may be achieved.

The displacement sensor 6 is configured as follows: The base 3 has a column 21 provided to stand upright thereon and extend upward therefrom. The column 21 has a slider 22 installed thereon so as to move in vertical direction. The slider 22 has an arm 23 installed thereon. The arm 23 is driven in horizontal direction so that a stylus (detector unit) 24 provided on its end comes in contact with the round surface of the workpiece 4, and subsequently the workpiece 4 is rotated, which enables radial displacements of the round surface of the workpiece 4 to be obtained as measurement data.

The measurement data obtained by the displacement sensor 6 is input to the processor 2, which in turn obtains, for example, the center coordinates and roundness of the measured section of the workpiece 4. The processor 2 has a processor main unit 31 that performs computations, an operation section 32, and a display 33.

Figure 2:
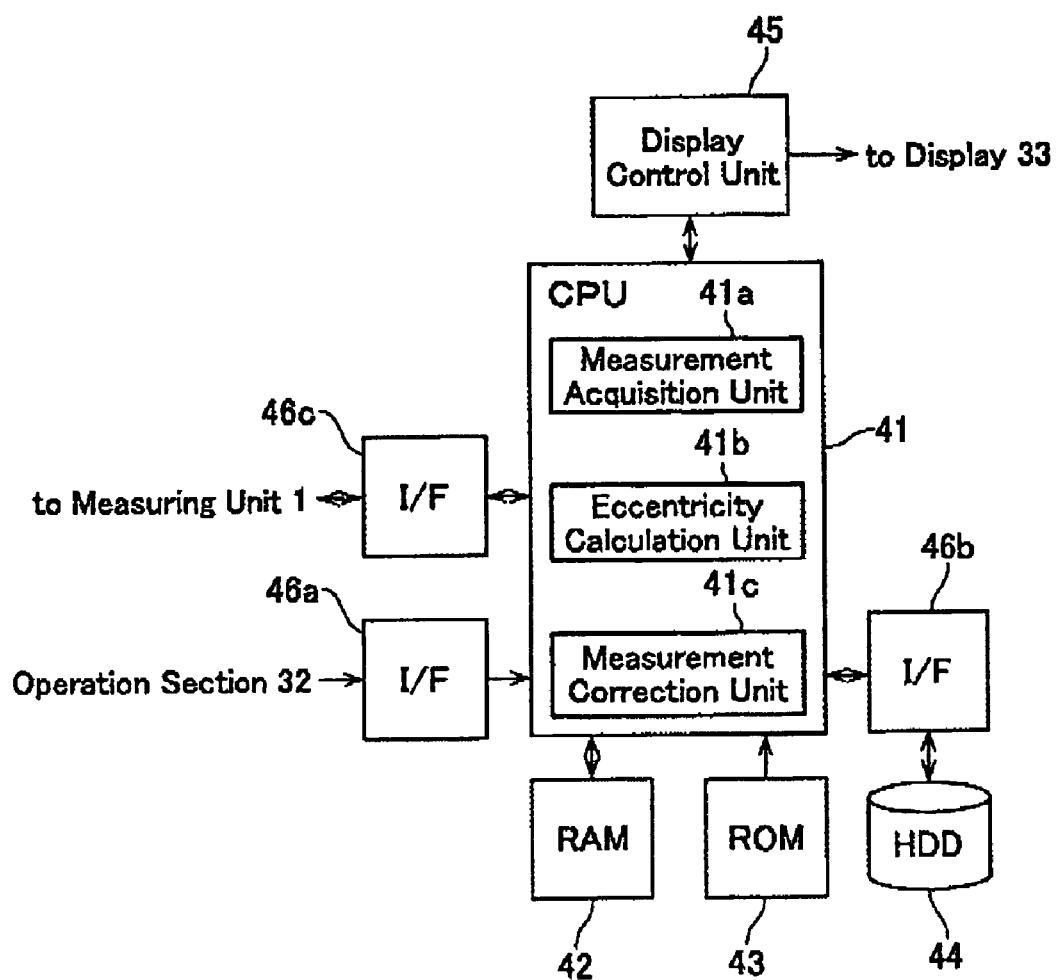
FIG. 2 is a block diagram illustrating a configuration of the processor main unit 31 according to an embodiment of the present invention.

Referring now to FIG. 2, the description is made to a configuration of the processor main unit 31. FIG. 2 is a block diagram illustrating a configuration of the processor main unit 31 according to an embodiment of the present invention.

The processor main unit 31 mainly has a CPU 41, a RAM 42, a ROM 43, an HDD 44, and a display control unit 45. In the processor main unit 31, code information and position information input from the operation section 32 are input to the CPU 41 via an I/F 46a. The CPU 41 performs operations, such as a measurement execution, eccentricity calculation, measurement correction, analysis, or display operation, according to a macro program stored in the ROM 43 and other programs stored in the RAM 42 from the HDD 44 via an I/F 46b.

According to the measurement execution operation, the CPU 41 controls the roundness measuring unit 1 via an I/F 46c. The HDD 44 is a storage medium that stores various types of control programs. The RAM 42 provides work areas for various types of operations, in addition to storage of various types of programs. In addition, the CPU 41 displays measurement results on the display 33 via the display control unit 45.

The CPU 41 reads and executes various types of programs from the HDD 44, thereby functioning as a measurement acquisition unit 41a, an eccentricity calculation unit 41b, and a measurement correction unit 41c.

Figure 3:
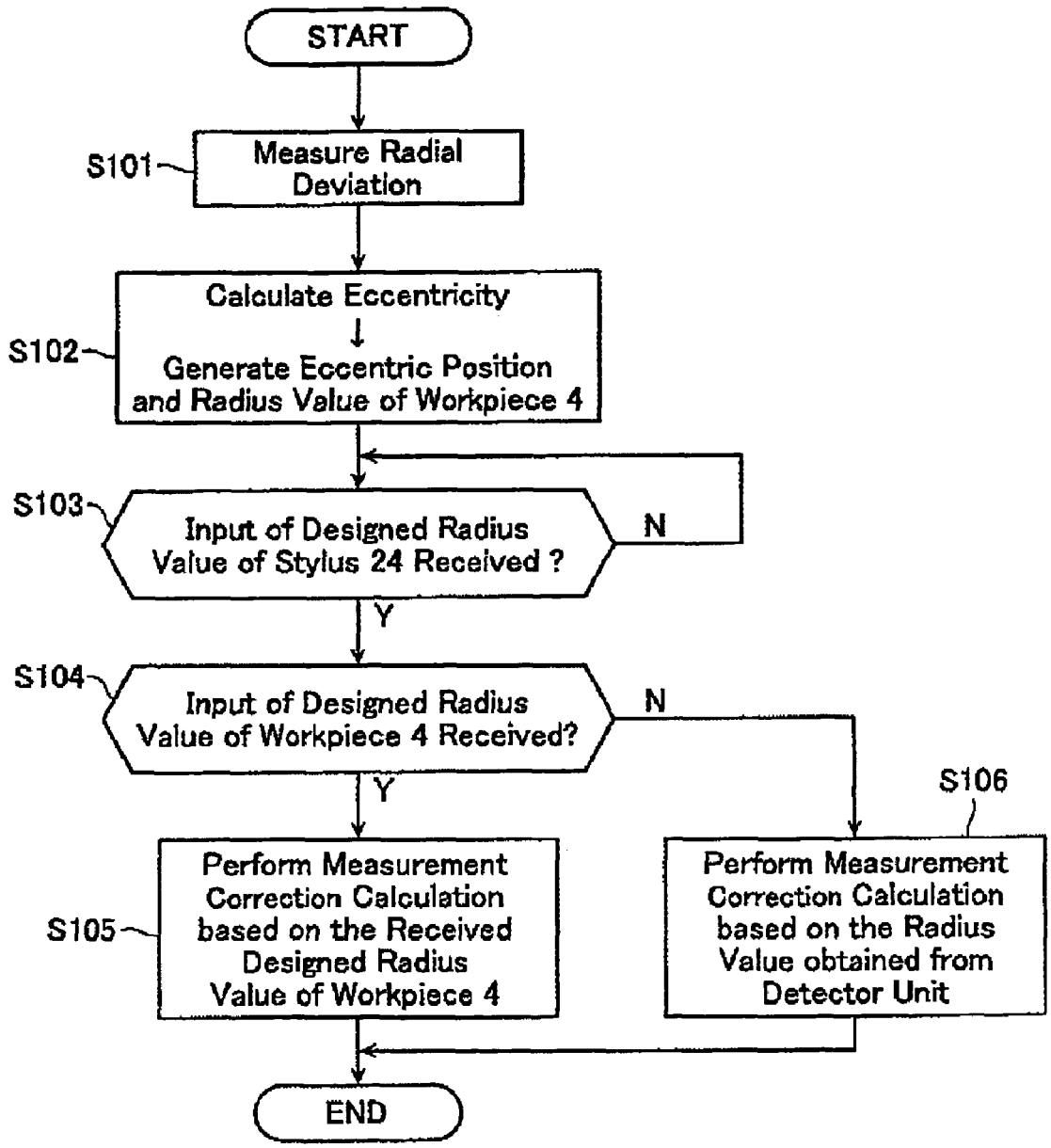
FIG. 3 is a flowchart illustrating operations of a roundness measuring unit according to an embodiment of the present invention.
Figure 4:
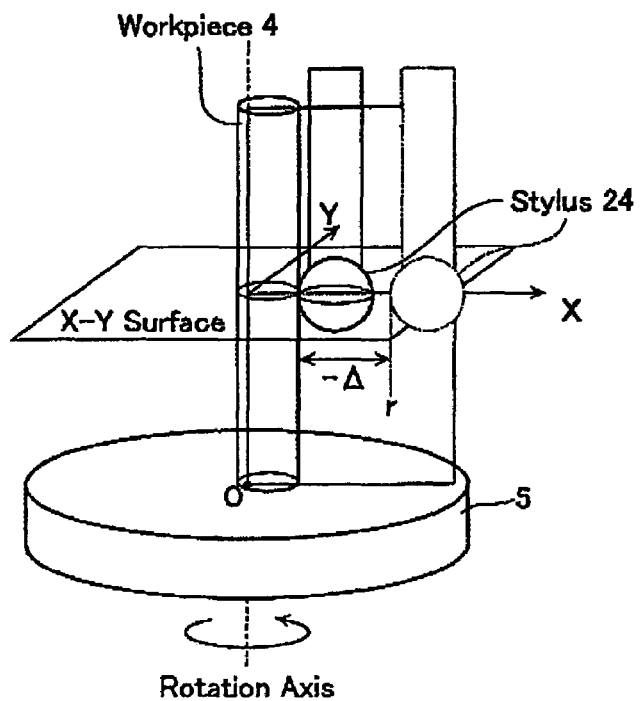
FIG. 4 is a schematic diagram illustrating a measurement operation performed by the roundness measuring unit according to an embodiment of the present invention.
Figure 5:
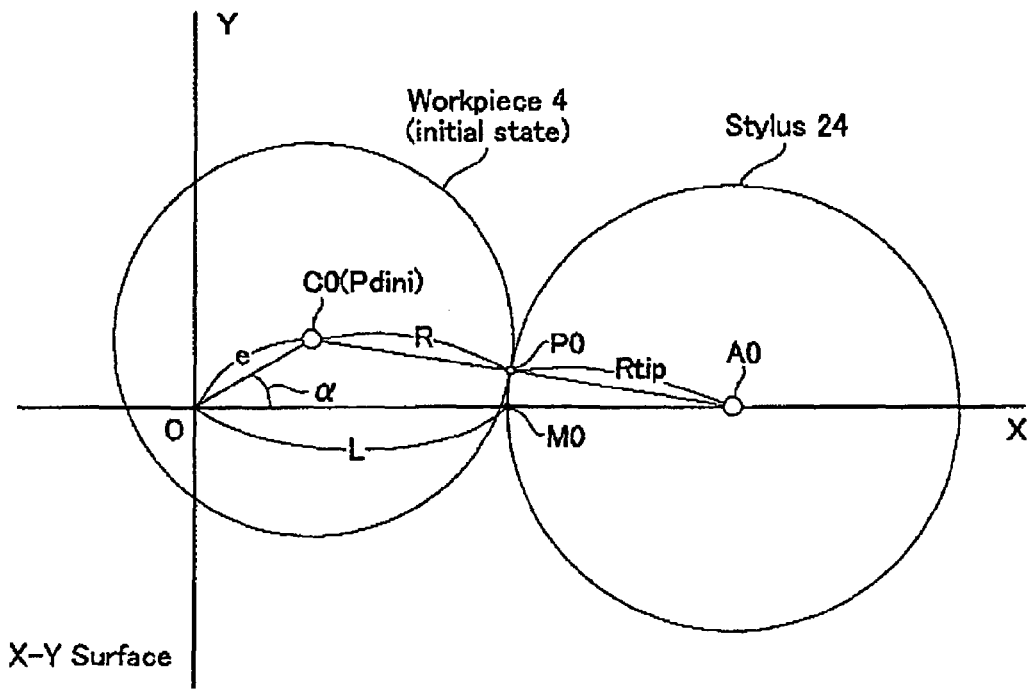
FIG. 5 is a diagram illustrating a relationship between measurements and the eccentric position that are measured by the roundness measuring unit according to an embodiment of the present invention.

Operations of the roundness measuring device according to this embodiment will now be described below. FIG. 3 is a flowchart illustrating operations of a roundness measuring device according to an embodiment of the present invention. Besides, operations illustrated in FIG. 3 are achieved by the CPU 41 reading and executing various types of programs from the HDD 44. FIG. 4 schematically illustrates a measurement operation performed on the workpiece 4 according to this embodiment; and FIG. 5 illustrates a relationship between the workpiece 4 and the stylus 24 in obtaining measurements (measured distances and measured angles). Besides, each example illustrated in FIGS. 4 and 5 begins with an initial state where the centering table 5 has not yet been rotated.

As illustrated in FIGS. 4 and 5, in detecting contacts using the stylus 24, the measurement acquisition unit 41a assumes an x-axis (a detection line) directed from the rotation axis O of the centering table 5 to the center A0 of the stylus 24. Then, the measurement acquisition unit 41a obtains a distance between the rotation axis O and an intersection (measurement point) MO where the x-axis intersects the surface of the stylus 24 as a measured distance L, as well as a rotating angle from the initial position (initial angle) provided by the rotary driver 12 as a measured angle θ.

Based on the measured distances and angles that are obtained by the measurement acquisition unit 41a, the eccentricity calculation unit 41b calculates an eccentric position Pdini of the workpiece 4. Wherein, an eccentric position Pdini is represented by an eccentric distance "e" and an eccentric angle "α". An eccentric distance "e" represents a distance between the rotation axis O and the axis C0 of the workpiece 4. In addition, an eccentric angle "α" represents an angle formed between the x-axis and a line segment connecting the rotation axis O and the axis C0 of the workpiece 4 in the initial state.

A measured distance is obtained by a radial deviation Δ. Wherein, a radial deviation Δ represents a deviation (length) in x-axis direction between a measurement point and a reference circle (the one centered at the rotation axis O of the centering table 5 and having a predetermined radius r (see FIG. 4)). A radial deviation Δ is measured based on a displacement magnitude of the stylus 24 on the x-axis, from a predetermined position to another contacting the side surface of the workpiece 4. A radial deviation Δ is measured each time the centering table 5 (the workpiece 4) is rotated around the rotation axis O. Besides, the eccentricity calculation (calculation of an eccentric position Pdini) is performed through a method, e.g., application of a function, which takes eccentric positions as parameters, to a plurality of measurements (measured distances and measured angles).

Based on the eccentric position Pdini (eccentric distance "e" and eccentric angle "α") obtained by the eccentricity calculation unit 41b, the measured angle obtained by the measurement acquisition unit 41a, the radius R of the workpiece 4, and the radius $R_{tip}$ of the stylus 24, the measurement correction unit 41c performs the following operations: correcting a measured distance L obtained by the measurement acquisition unit 41a so that a distance from the rotation axis O to the contact point P where the workpiece 4 contacts the stylus 24 is calculated as a measured distance; and correcting the measured angle θ by adding a correction angle γ, which is formed between the x-axis and the line segment connecting the contact point P and the rotation axis O, to the measured angle θ obtained by the measurement acquisition unit 41a.

As illustrated in FIG. 3, the measurement acquisition unit 41a first measures a radial deviation Δ of the workpiece 4 (step S101).

Then, the eccentricity calculation unit 41b calculates an eccentric position (eccentric distance "e" and eccentric angle "α") based on the measured radial deviation Δ and generates a corresponding eccentric position (eccentric distance "e" and eccentric angle "α") and a radius value R of the workpiece 4 (step S102).

Referring now to FIG. 4 and FIG. 5, the description is made to a relationship between the workpiece 4 and the stylus 24 when a contact point P is measured that represents a measurement at a position on the surface of the workpiece 4.

As illustrated in FIG. 4, the stylus 24 is brought into contact with the workpiece 4. Then, a radial deviation Δ is measured based on a displacement of the stylus 24 contacting the workpiece 4 from a predetermined position (the reference circle) in x-axis direction.

Based on the radial deviation Δ, the distance from the rotation axis O to an intersection M0 between the x-axis and the stylus 24 becomes a measured distance L. In this case, if the workpiece 4 has no eccentricity with respect to the rotation axis O (if e=0), then the measured distance L is determined without any errors.

This measurement is performed with the centering table 5 rotated around the rotation axis O. In the case of FIG. 4, the cross-sectional shape of the x-y surface of the stylus 24 is measured, based on which, the roundness is measured accordingly. Further, as illustrated in FIG. 5, if the center C0 of the workpiece 4 with the radius R is eccentric from the rotation axis O at the eccentric distance "e" and eccentric angle "α" in the initial state, and if a measurement is performed by the stylus 24 with the radius $R_{tip}$ from the center A0, then the workpiece 4 and the stylus 24 come in contact with one another when a distance between the center C0 and the center A0 becomes equal to "R+$R_{tip}$". Thus, when they come in contact with one another, the measured distance (the distance (OM0) from the rotation axis O) at the measurement point M0 on the x-axis is different from the value of the contact point P0. That is, some errors are included in the measurement (measured distance L) at the measurement point M0. Besides, the measurement point M0 is located on the x-axis apart from the center A0 by a distance of the radius $R_{tip}$ in the direction of the rotation axis O.

Referring again to FIG. 3, the description is made to the operations of the roundness measuring device. Following step S102, the measurement correction unit 41c determines whether an input of the radius value ($R_{tip}$) of the stylus 24 has been received (step S103). In this case, if it is determined by the measurement correction unit 41c that an input of the radius value ($R_{tip}$) of the stylus 24 has not been received ("N" branch at step S103), then iteratively performs the operation of step S104. Alternatively, if it is determined by the measurement correction unit 41c that an input of the radius value ($R_{tip}$) of the stylus 24 has been received ("Y" branch at step S103), then the process proceeds to the next operation.

Following step S103, the measurement correction unit 41c determines whether an input of a designed radius value of the workpiece 4 has been received (step S104). In this case, if it is determined by the measurement correction unit 41c that an input of a designed radius value of the workpiece 4 has been received ("Y" branch at step S104), then a measurement correction calculation is performed based on the received designed radius value of the workpiece 4 (step S105). Alternatively, if it is determined by the measurement correction unit 41c that an input of a designed radius value of the workpiece 4 has not been received ("N" branch at step S104), then a measurement correction calculation is performed based on a radius value R' that can be obtained from the displacement magnitude between the reference position of the arm 23 to the measured position of the arm 23 (step S106). In other words, in step S106, the measurement correction unit 41c performs a measurement correction calculation based on a radius value R' that can be obtained from a displacement magnitude of the stylus 24, instead of the designed radius value of the workpiece 4.

Figure 6:
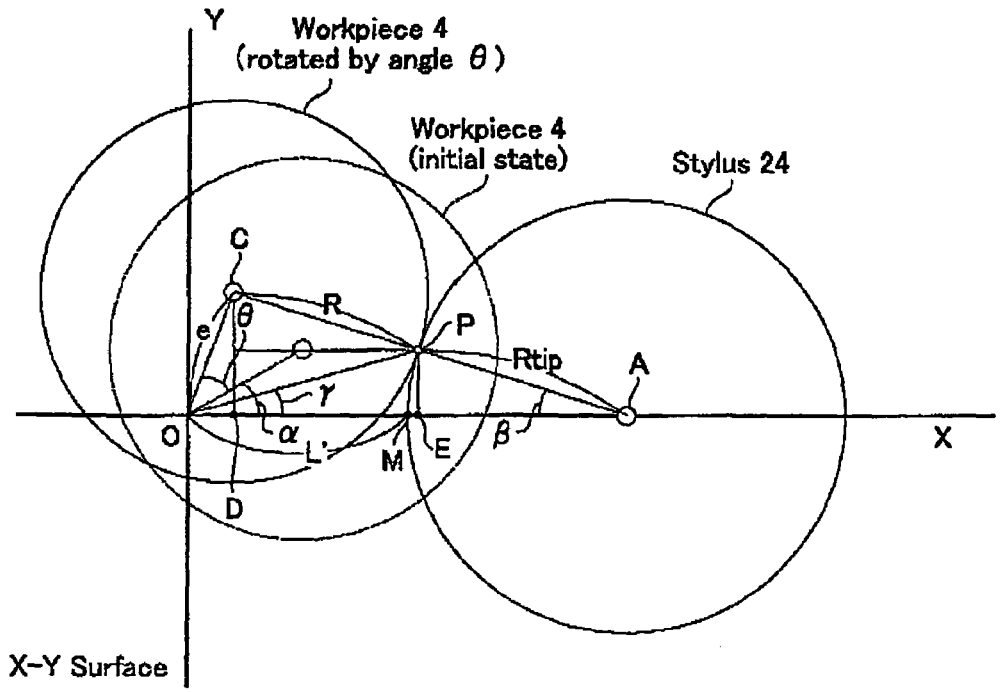
FIG. 6 is a diagram illustrating an operation for correcting a measurement measured by the roundness measuring unit according to an embodiment of the present invention.
Figure 7:
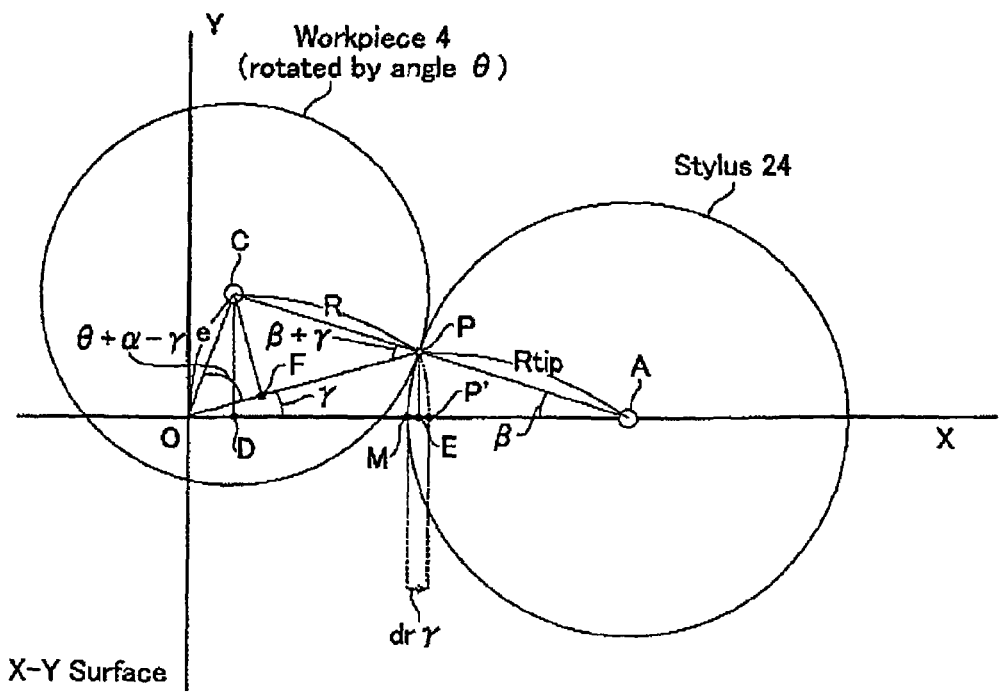
FIG. 7 is a diagram illustrating another operation for correcting the measurement measured by the roundness measuring unit according to an embodiment of the present invention.

Referring now to FIGS. 6 and 7, the description is made to an operation for measurement correction calculation to correct a measurement measured by the roundness measuring device according to an embodiment of the present invention. At first, referring to FIG. 6, a method for calculating a correction angle for use in correction of a measured angle will be described below. FIGS. 6 and 7 illustrate a state following the previous state (initial state) illustrated in FIG. 5, wherein the centering table 5 is rotated by a measured angle θ. Thus, as illustrated in FIG. 6, the axis C0 of the workpiece 4 is positioned at a distance "e" from the rotation axis O, and at an angle of "θ+α" (an angle from the x-axis) with respective to the rotation axis O. It is assumed that the stylus 24 comes in contact with the workpiece 4 at the contact point P when the workpiece 4 is rotated by an angle θ on the centering table 5 and that a measured distance L' is obtained based on the measurement point M on the x-axis. In this case, let "C" be the eccentric position of the workpiece 4, "A" be the center of the stylus 24, "γ" be angle POA, "β" be angle PAO, "D" be an intersection between the x-axis and a perpendicular line drawn from the eccentric position C to the x-axis, and "E" be an intersection between the x-axis and a perpendicular line drawn from the contact point P to the x-axis.

Under these conditions, each angle γ and β can be represented by the following Formula 1 and Formula 2:

$$\gamma = \arctan\frac{PE}{DE+OD} = \arctan\left(\frac{R_{tip}\sin\beta}{R\cos\beta + e\cos(\theta+\alpha)}\right) \quad \text{[Formula 1]}$$

$$\beta = \arcsin\frac{CD}{AC} = \arcsin\left(\frac{e\sin(\theta+\alpha)}{R+R_{tip}}\right) \quad \text{[Formula 2]}$$

As a result, angle γ in Formula 1 becomes a correction angle, which is in turn added to a measured angle. In this way, the measured angle is corrected.

Referring now to FIG. 7, a method for calculating a correction distance for use in correction of a measured distance will be described below. A correction distance is first added to a measured distance, through which the measured distance is corrected to be equal to the distance from the rotation axis O to the contact point P. In FIG. 7, let "F" be the intersection where a perpendicular line drawn from the eccentric position C to a line segment OP intersects the line segment OP, "P'" be a point on the x-axis apart from the rotation axis O by a distance equal to the distance OP, and "dry" be a distance between points M and P'.

Under these conditions, each distance dry and OP can be represented by the following Formula 3 and Formula 4.

$$d r\gamma = EP' + ME = OP(1-\cos\gamma) + R_{tip}(1-\cos\beta) \quad \text{[Formula 3]}$$

$$OP = OF + FP = e\cos(\theta+\alpha-\gamma) + R\cos(\beta+\gamma) \quad \text{[Formula 4]}$$

As a result, distance dry in Formula 3 becomes a correction distance, which is in turn added to a measured distance. In this way, the measured distance is corrected to be equal to the distance between the rotation axis O and the contact point P.

The above-mentioned measured distance and measured angle after correction are each represented by the following Formula 5 and Formula 6.

measured distance(after correction)=measured distance (before correction)+dry  [Formula 5]

measured angle(after correction)=measured angle (before correction)+γ  [Formula 6]

As mentioned above, according to the roundness measuring device of an embodiment of the present invention, a measured distance is shifted by the measurement correction unit 41c by correction distance dry and a measured angle is rotated around the rotation axis O by correction angle γ, through which the measured distance and angle become equal to each value of the contact point P. Therefore, errors can be prevented from occurring in measurements even if the workpiece 4 has an eccentricity.

What is claimed is:

1. A roundness measuring device comprising:
a rotation unit rotating a measured object around a rotation axis;
a detector unit detecting a contact based on the contact of the detector unit with the measured object; and
a measurement acquisition unit assuming a detection line connecting the rotation axis and the center of the detector unit when a contact is detected by the detector unit, obtaining a distance between the rotation axis and an intersection where the detection line intersects a surface of the detector unit as a measured distance, and obtaining a rotating angle provided by the rotation unit as a measured angle, and the roundness measuring device further comprising:
an eccentric position calculation unit calculating, based on the measured distance and the measured angle, a distance between the axis of the measured object and the rotation axis as an eccentric distance, and calculating an angle formed between the detection line and a line segment connecting the rotation axis and the axis of the measured object as an eccentric angle; and a measurement correction unit correcting the measured distance based on the eccentric distance, the eccentric angle, the measured angle, a radius of the measured object, and a length from the center to the surface of the detector unit, and correcting the measured angle by adding a correction angle to the measured angle, the correction angle being formed between the detection line and a line segment connecting the rotation axis and a contact point where the measured object and the detector unit come in contact with one another.

2. The roundness measuring device according to claim 1, wherein
let "e" be the eccentric distance, "α" be the eccentric angle, "θ" be the measured angle, "R" be the radius of the measured object, "$R_{tip}$" be a length from the center to the surface of the detector unit, "γ" be the correction angle, and "dry" be a correction distance added to the measured distance for correction, the measurement correction unit calculates the correction angle and the correction distance based on the following Formula (1) through Formula (4):

$$\gamma = \arctan\left(\frac{R_{tip}\sin\beta}{R\cos\beta + e\cos(\theta+\alpha)}\right) \quad \text{[Formula 1]}$$

$$\beta = \arcsin\left(\frac{e\sin(\theta+\alpha)}{R+R_{tip}}\right) \quad \text{[Formula 2]}$$

$$d r\gamma = OP(1-\cos\gamma) + R_{tip}(1-\cos\beta) \quad \text{[Formula 3]}$$

$$OP = e\cos(\theta+\alpha-\gamma) + R\cos(\beta+\gamma) \quad \text{[Formula 4]}.$$

3. The roundness measuring device according to claim 1, wherein
the measurement correction unit receives an input of a radius of the measured object.

4. The roundness measuring device according to claim 1, wherein
the measurement correction unit receives an input of a length from the center to the surface of the detector unit.

5. The roundness measuring device according to claim 4, wherein
if the measurement correction unit determines that an input of a length from the center to the surface of the detector unit has not been received, the measurement correction unit performs a measurement correction calculation based on, instead of the length, a value that can be obtained from a displacement magnitude of the detector unit.

6. A method of measuring roundness using a roundness measuring device having:

a rotation unit rotating a measured object around a rotation axis;

a detector unit detecting a contact based on the contact of the detector unit with the measured object; and a measurement acquisition unit assuming a detection line connecting the rotation axis and the center of the detector unit when a contact is detected by the detector unit, obtaining a distance between the rotation axis and an intersection where the detection line intersects a surface of the detector unit as a measured distance, and obtaining a rotating angle provided by the rotation unit as a measured angle, the method comprising:

an eccentric position calculation step of calculating, based on the measured distance and the measured angle, a distance between the axis of the measured object and the rotation axis as an eccentric distance, and calculating an angle formed between the detection line and a line segment connecting the rotation axis and the axis of the measured object as an eccentric angle; and a measurement correction step of correcting the measured distance based on the eccentric distance, the eccentric angle, the measured angle, a radius of the measured object, and a length from the center to the surface of the detector unit, and correcting the measured angle by adding a correction angle to the measured angle, the correction angle being formed between the detection line and a line segment connecting the rotation axis and a contact point where the measured object and the detector unit come in contact with one another.

7. The method of measuring roundness according to claim 6, wherein let "e" be the eccentric distance, "α" be the eccentric angle, "θ" be the measured angle, "R" be the radius of the measured object, "$R_{tip}$" be a length from the center to the surface of the detector unit, "γ" be the correction angle, and "dγ" be a correction distance added to the measured distance for correction, in the measurement correction step, the correction angle and the correction distance are calculated based on the following Formula (5) through Formula (8):

$$\gamma = \arctan\left(\frac{R_{tip}\sin\beta}{R\cos\beta + e\cos(\theta + \alpha)}\right) \quad \text{[Formula 5]}$$

$$\beta = \arcsin\left(\frac{e\sin(\theta + \alpha)}{R + R_{tip}}\right) \quad \text{[Formula 6]}$$

$$d\gamma = OP(1 - \cos\gamma) + R_{tip}(1 - \cos\beta) \quad \text{[Formula 7]}$$

$$OP = e\cos(\theta + \alpha - \gamma) + R\cos(\beta + \gamma) \quad \text{[Formula 8]}.$$

8. The method of measuring roundness according to claim 6, wherein in the measurement correction step, an input of a radius of the measured object is received.

9. The method of measuring roundness according to claim 6, wherein in the measurement correction step, an input of a length from the center to the surface the detector unit is received.

10. The method of measuring roundness according to claim 9, wherein if an input of a length from the center to the surface of the detector unit has not been received in the measurement correction step, a measurement correction calculation is performed based on, instead of the length, a value that can be obtained from a displacement magnitude of the detector unit.

11. A storage medium including a program for measuring roundness using a roundness measuring device, and being configured to be read by a computer, the roundness measuring device having:

a rotation unit rotating a measured object around a rotation axis;

a detector unit detecting a contact based on the contact of the detector unit with the measured object; and a measurement acquisition unit assuming a detection line connecting the rotation axis and the center of the detector unit when a contact is detected by the detector unit, obtaining a distance between the rotation axis and an intersection where the detection line intersects a surface of the detector unit as a measured distance, and obtaining a rotating angle provided by the rotation unit as a measured angle, the program causing the computer to perform:

an eccentric position calculation step of calculating, based on the measured distance and the measured angle, a distance between the axis of the measured object and the rotation axis as an eccentric distance, and calculating an angle formed between the detection line and a line segment connecting the rotation axis and the axis of the measured object as an eccentric angle; and a measurement correction step of correcting the measured distance based on the eccentric distance, the eccentric angle, the measured angle, a radius of the measured object, and a length from the center to the surface of the detector unit, and correcting the measured angle by adding a correction angle to the measured angle, the correction angle being formed between the detection line and a line segment connecting the rotation axis and a contact point where the measured object and the detector unit come in contact with one another.

12. The storage medium according to claim 11, wherein let "e" be the eccentric distance, "α" be the eccentric angle, "θ" be the measured angle, "R" be the radius of the measured object, "$R_{tip}$" be a length from the center to the surface of the detector unit, "γ" be the correction angle, and "dγ" be a correction distance added to the measured distance for correction, in the measurement correction step, the correction angle and the correction distance are calculated based on the following Formula (9) through Formula (12):

$$\gamma = \arctan\left(\frac{R_{tip}\sin\beta}{R\cos\beta + e\cos(\theta + \alpha)}\right) \quad \text{[Formula 9]}$$

$$\beta = \arcsin\left(\frac{e\sin(\theta + \alpha)}{R + R_{tip}}\right) \quad \text{[Formula 10]}$$

$$d\gamma = OP(1 - \cos\gamma) + R_{tip}(1 - \cos\beta) \quad \text{[Formula 11]}$$

$$OP = e\cos(\theta + \alpha - \gamma) + R\cos(\beta + \gamma) \quad \text{[Formula 12]}.$$

13. The storage medium according to claim 11, wherein in the measurement correction step, an input of a radius of the measured object is received.

14. The storage medium according to claim 11, wherein in the measurement correction step, an input of a length from the center to the surface of the detector unit is received.

15. The storage medium according to claim 14, wherein if an input of a length from the center to the surface of the detector unit has not been received in the measurement correction step, a measurement correction calculation is performed based on, instead of the length, a value that can be obtained from a displacement magnitude of the detector unit.

* * * * *